US008828576B2

(12) United States Patent
Kumar et al.

(10) Patent No.: US 8,828,576 B2
(45) Date of Patent: Sep. 9, 2014

(54) PRISMATIC CELL WITH INTEGRATED COOLING PLATE

(75) Inventors: Vinod Kumar, Pittsford, NY (US); Richard C. Deming, Jr., Bruce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 286 days.

(21) Appl. No.: 13/045,672

(22) Filed: Mar. 11, 2011

(65) Prior Publication Data

US 2012/0231313 A1  Sep. 13, 2012

(51) Int. Cl.
*H01M 10/50* (2006.01)
*H01M 10/647* (2014.01)
*H01M 10/6551* (2014.01)
*H01M 10/6554* (2014.01)
*H01M 10/654* (2014.01)
*H01M 10/613* (2014.01)
*H01M 10/0585* (2010.01)
*H01M 10/052* (2010.01)

(52) U.S. Cl.
CPC ...... *H01M 10/5004* (2013.01); *H01M 10/0585* (2013.01); *H01M 10/5032* (2013.01); *H01M 10/5046* (2013.01); *Y02E 60/12* (2013.01); *H01M 10/5053* (2013.01); *H01M 10/052* (2013.01); *H01M 2220/20* (2013.01); *H01M 10/5042* (2013.01)
USPC .......................................................... 429/120

(58) Field of Classification Search
None
See application file for complete search history.

(56) References Cited

U.S. PATENT DOCUMENTS

| 4,542,082 | A  | * | 9/1985  | Rowlette ........................ 429/210 |
| 6,821,671 | B2 | * | 11/2004 | Hinton et al. .................. 429/120 |
| 2003/0017384 | A1 | * | 1/2003  | Marukawa et al. ............ 429/120 |
| 2005/0084749 | A1 | * | 4/2005  | Hwang et al. .................. 429/127 |
| 2007/0018610 | A1 | * | 1/2007  | Wegner ........................ 320/112 |
| 2010/0136411 | A1 | * | 6/2010  | Yoon et al. ..................... 429/144 |
| 2010/0330408 | A1 | * | 12/2010 | Yoon et al. ..................... 429/120 |
| 2011/0003185 | A1 | * | 1/2011  | Kritzer ............................ 429/56 |

FOREIGN PATENT DOCUMENTS

| CN | 1574415 A   | 2/2005 |
| CN | 1610166 A   | 4/2005 |
| CN | 101416343 A | 4/2009 |

* cited by examiner

*Primary Examiner* — Patrick Ryan
*Assistant Examiner* — Jose Colucci Rios
(74) *Attorney, Agent, or Firm* — Fraser Clemens Martin & Miller LLC; J. Douglas Miller

(57) ABSTRACT

A battery cell assembly includes a battery cell including active material configured to generate power from an electrochemical reaction. A pouch formed from insulating material envelopes the battery cell. The battery cell assembly further includes a cooling element having an internal portion and an external portion. The internal portion is disposed within the pouch and is in thermal communication with the battery cell. The external portion is disposed outside of the pouch. The cooling element is configured to transfer heat generated during the electrochemical reaction away from the battery cell.

20 Claims, 2 Drawing Sheets

PRISMATIC CELL WITH INTEGRATED COOLING PLATE

FIELD OF THE INVENTION

The present disclosure relates to a battery cell assembly and more particularly to a battery cell assembly with an integrated cooling element.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Typical prismatic battery cells have a pair of plastic coated metal layers fused around a periphery of the battery cell in order to seal the battery cell components. The sealing of the battery cells generally begin with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell for incorporation in a battery pack assembly is thereby provided.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion battery packs to militate against the undesirable overheating conditions. The cooling systems may include cooling plates or fins sandwiched between individual battery cells within the battery pack. The cooling system may have channels through which a coolant flows in a heat transfer relationship with the battery cells. Nonlimiting examples of known cooling systems for battery cells are described in Assignee's co-pending U.S. patent application Ser. No. 12/713,729 to Essinger et al. and U.S. patent application Ser. No. 12/842,478 to Kumar et al., the entire disclosures of which are hereby incorporated herein by reference.

There is a continuing need for a battery cell assembly having a simplified design and a reduced number of parts. Desirably, the battery cell assembly has decoupled electrical and thermal aspects, enables air cooling of the battery cell assembly in operation, and minimizes part handling during manufacturing of the battery cell assembly.

SUMMARY OF THE INVENTION

In concordance with the instant disclosure, a battery cell assembly having a simplified design and a reduced number of parts, and which has decoupled electrical and thermal aspects, enables air cooling of the battery cell assembly in operation, and minimizes part handling during manufacturing of the battery cell assembly, is surprisingly discovered.

In a first embodiment, a battery cell assembly includes a battery cell having active material configured to generate power from an electrochemical reaction. The battery cell assembly includes a pouch is formed from an insulating material. The pouch envelopes the battery cell. The battery cell assembly further includes a cooling element having an internal portion and an external portion. The internal portion is disposed within the pouch and is in thermal communication with the battery cell. The external portion is disposed outside of the pouch. The cooling element is configured to transfer heat generated during the electrochemical reaction away from the battery cell.

In another embodiment, the pouch of the battery cell assembly includes a first pouch layer and a second pouch layer. The cooling element further includes a sealing portion. The sealing portion abuts each of the first pouch layer and the second pouch layer to seal the battery cell within the pouch.

In a further embodiment, the battery cell assembly includes a pair of electrical tabs in communication with the battery cell and extending outwardly from at least one of a first end and a second end of the pouch. The external portion of the cooling element extends outwardly from at least one of a first side and a second side of the pouch. The battery cell assembly further includes a rigid frame disposed between the first pouch layer and the second pouch layer. The external portion of the cooling element is disposed through the rigid frame and outside of the pouch.

In an illustrative embodiment, a metal plate is placed within a roll of cell active material before sealing a battery cell of a battery cell assembly inside a plastic coated pouch. The metal plate has a larger surface area than the active cell material. The metal plate is also coated with an electrically insulating material. When the battery cell is sealed around a periphery thereof, the metal plate is also sealed along the periphery, leaving a portion of the metal plate inside the battery cell and another portion disposed outside of the pouch. The insulating material on the metal plate ensures that the metal plate does not short circuit the battery cell of the battery cell assembly. The insulating material on the portion of the metal plate not sealed inside the pouch is removed for enhanced thermal conductivity.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
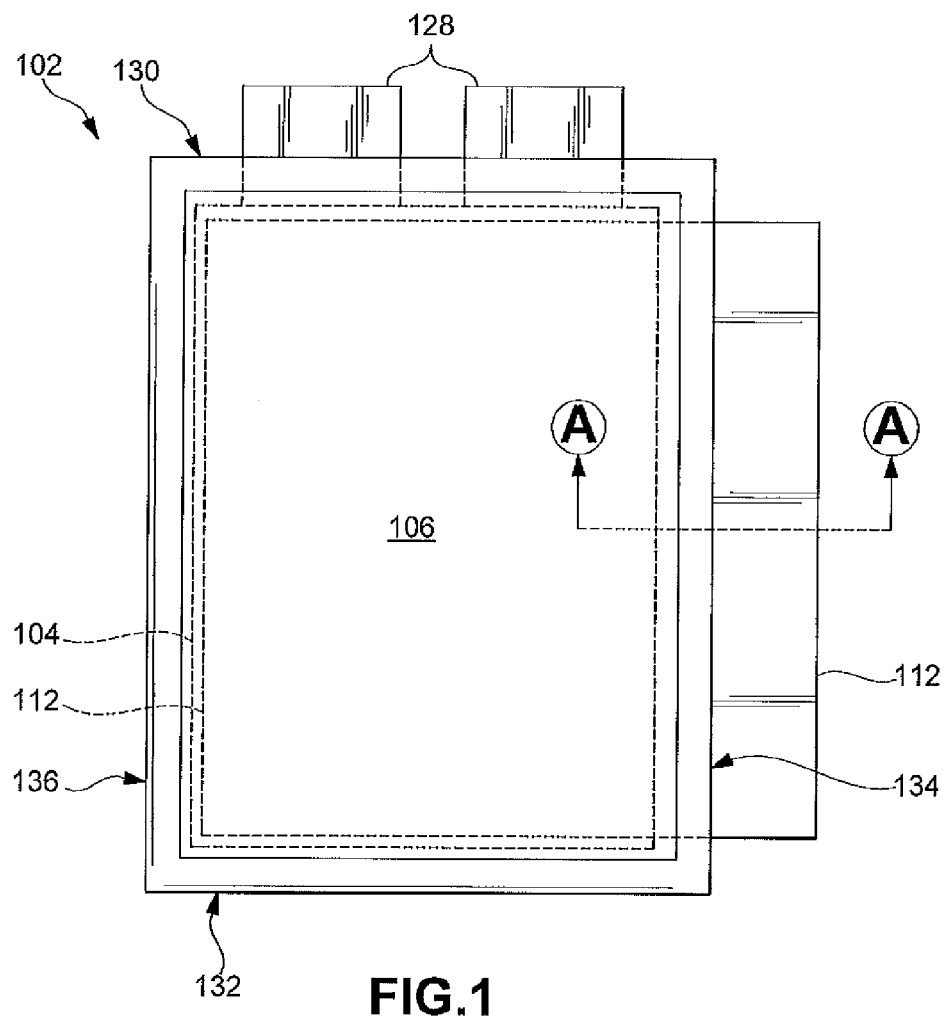
FIG. 1 is a front elevational view of a battery cell assembly of the present disclosure, with an interior battery cell and a portion of a cooling element inside the battery cell assembly shown in dashed lines.
Figure 2:
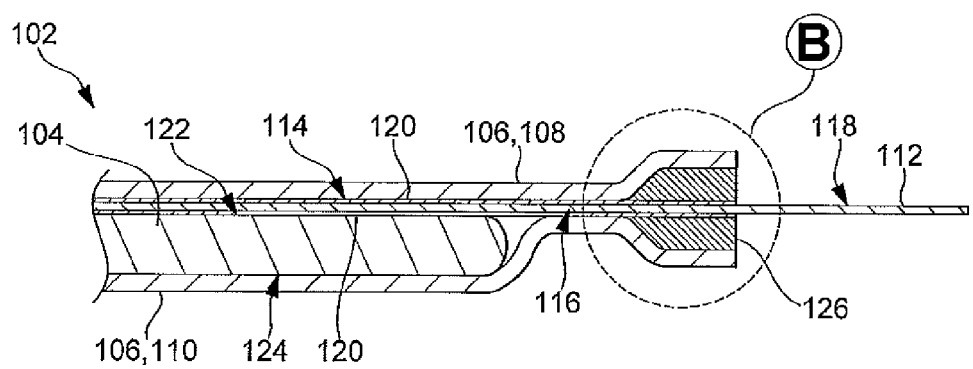
FIG. 2 is a fragmentary side cross sectional view of the battery cell assembly according to one embodiment of the present disclosure, taken along section line A-A in FIG. 1.
Figure 3:
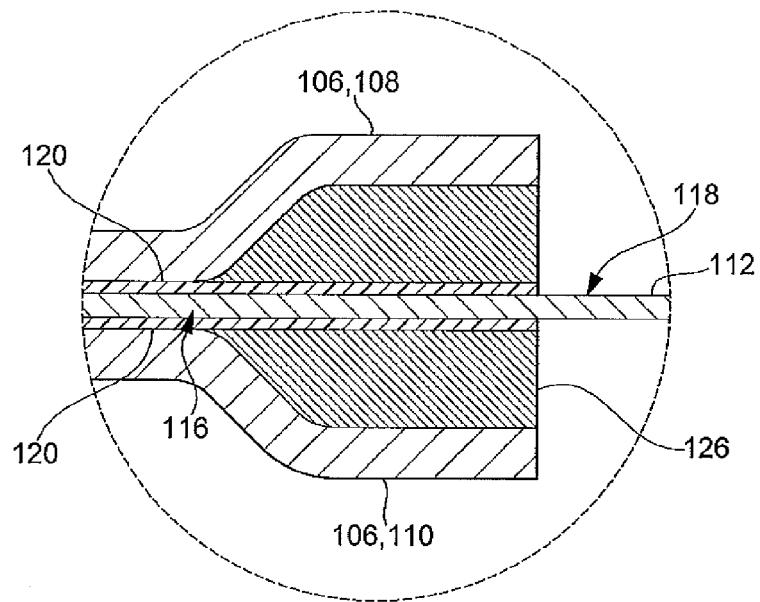
FIG. 3 is an enlarged fragmentary side cross sectional view of the battery cell assembly identified by callout B in FIG. 2.

With reference to FIGS. 1-3, a battery cell assembly 102 according to one embodiment the present disclosure is shown. The battery cell assembly 102 includes a battery cell 104 having active material configured to generate power from an electrochemical reaction. The battery cell 104 shown is a prismatic battery cell. As a nonlimiting example, the battery cell 104 may be a prismatic lithium ion (Li-ion) pouch cell. It should be appreciated that other types of the battery cells 104, employing a different structure and electrochemistry, may also be used within the scope of the present invention.

The battery cell assembly 102 has a pouch 106 formed from an insulating material. The pouch 106 envelopes the battery cell 104 and permits a plurality of the battery cells 104 to be disposed in a stack, thereby forming a battery pack (not shown). The pouch 106 is preferably electrically nonconductive. As a nonlimiting example, the pouch 106 may be formed from aluminum coated with a dielectric material such as a rubber or a thermoplastic. In particular embodiments, the pouch 106 includes a first pouch layer 108 and a second pouch layer 110, and the battery cell 104 is disposed between the first layer 108 and the second layer 110. Other electrically nonconductive materials and structures may also be employed, as desired.

In the battery cell assembly 102 of the present disclosure, a cooling element 112 is disposed in thermal communication with the battery cell 104. The cooling element 112 is configured to transfer heat generated during the electrochemical reaction away from the battery cell 104. The cooling element 112 may include a metal plate, for example. As nonlimiting examples, the cooling element 112 may be formed from one of copper and aluminum. In another example, the cooling element 112 is a graphite foil impregnated with an electrically nonconductive polymer. The cooling element 112 may further be formed from a plurality of strips or have a lattice-like structure, for example, in order to provide thermal conduction from the battery cell 104 while minimizing the thermal mass of the battery cell assembly 102. A skilled artisan should appreciate that other suitable materials and structures for the cooling element 112 are also within the scope of the present disclosure.

Referring to FIG. 2, the cooling element 112 may have an internal portion 114, a sealing portion 116, and an external portion 118. The internal portion 114 is disposed within the pouch 106. The sealing portion 116 is disposed between the internal portion 114 and the external portion 118. The external portion 118 is disposed outside of the pouch 106. The external portion 118 may have a coating. The coating may militate against corrosion of the external portion 118. The coating may also have a minimal thickness in order to maximize a thermal conduction from the external portion 118 of the cooling element 112. In other embodiments, the external portion 118 is substantially free of any coating. It should be understood that the external portion 118 is thereby exposed to facilitate the thermal conduction from the battery cell 104. The external portion 118 of the cooling element 112 may be placed in communication with a flow of cooling fluid, for example, an ambient temperature air stream, during operation of the battery cell assembly 102 in order to maintain the battery cell 104 at a desired temperature.

The internal portion 114 of the cooling element 112 may have an insulating coating 120. The insulating coating 120 may be formed from a dielectric material such as a rubber or a thermoplastic, for example. The insulating coating 120 is configured to electrically insulate the cooling element 112 from the battery cell 104. The insulating coating 120 has a thickness sufficient to electrically insulate the cooling element 112 while permitting thermal conduction from the battery cell 104 to the cooling element 112, for the purpose of maintaining the desired temperature of the battery cell 104 in operation. Where the insulating coating 120 is employed, the external portion 118 of the cooling element 112 may be free of the insulating coating 120 in order to facilitate the thermal conduction. One of ordinary skill in the art may select suitable dielectric materials and thicknesses for the insulating coating 120, as desired.

As shown in FIG. 2, the battery cell 104 may include a first major surface 122 and a second major surface 124. The cooling element 112 may have a surface area greater than a surface area of one of the first major surface 122 and the second major surface 124. The internal portion 114 of the cooling element 112 is disposed adjacent one of the first major surface 122 and the second major surface 124. For example, the internal portion 114 of the cooling element 112 may abut one of the first major surface 122 and the second major surface 124 in order to conduct heat from the battery cell 104, in operation.

In particular embodiments, the sealing portion 116 of the cooling element 112 has the insulating coating 120. Where the pouch 106 includes the first pouch layer 108 and the second pouch layer 110, the sealing portion 116 of the cooling element 112 may abut each of the first pouch layer 108 and the second pouch layer 110 to seal the battery cell 104 within the pouch 106. The seal may be formed by at least one of friction and heat welding the first pouch layer 108 and the second pouch layer 110 to the insulating coating 120 of the sealing portion 116, for example. The thermoplastic material for each of the first and second pouch layers 108, 110 and the insulating coating 120 may be selected to provide sufficient bonding between the respective materials upon welding. Adhesives may also be employed between the first pouch layer 108, the second pouch layer 110, and the insulating coating 120 of the sealing portion 116 to seal the battery cell 104 within the pouch 106. Alternative means for sealing the battery cell 104 within the pouch 106 may also be employed, as desired.

In certain embodiments, the battery cell assembly 102 of the present disclosure may include a rigid frame 126. An exemplary rigid frame 126 is disclosed in Assignee's co-pending U.S. patent application Ser. No. 12/692,800 to Kumar et al., the entire disclosure of which is hereby incorporated herein by reference. The rigid frame 126 permits a plurality of the battery cell assemblies 102 to be arranged in the stack to form the battery pack. For example, the rigid frame 126 may be disposed between the first pouch layer 108 and the second pouch layer 110. The first pouch layer 108 and the second pouch layer 110 may be one of friction and heat welded to the rigid frame 126, for example, to seal the battery pack 104 within the pouch 106. Where the rigid frame 126 is employed, the cooling element 112 may be disposed one of through and adjacent the rigid frame 126. For example, the rigid frame 126 may be disposed adjacent the sealing portion 116 of the cooling element 112, and the external portion 118 of the cooling element 112 may be disposed through the rigid frame 126. In another example, the external portion 118 of the cooling element 112 may be disposed alongside an outer surface of the rigid frame 126.

The battery cell assembly 102 of the present disclosure also includes a pair of electrical tabs 128. The electrical tabs 128 are in communication with the battery cell 104 and extend outwardly from the pouch 106. Where the pouch 106 has a first end 130 and a second end 132, and a first side 134 and a second side 136, the pair of electrical tabs 128 may extend outwardly from at least one of the first end 130 and the second end 132. The external portion 118 the cooling element 112 may then extend outwardly from at least one of the first side 134 and the second side 136 of the pouch 106. It should be appreciated that the cooling element 112 may also extend outwardly from more than one of the first side 130 and the second side 132 and the first end 134 and the second end 136, as long as the cooling element 112 does not contact one of the pair of electrical tabs 128. The electrical and thermal aspects of the battery cell assembly 102 thereby remain decoupled.

Figure 4:
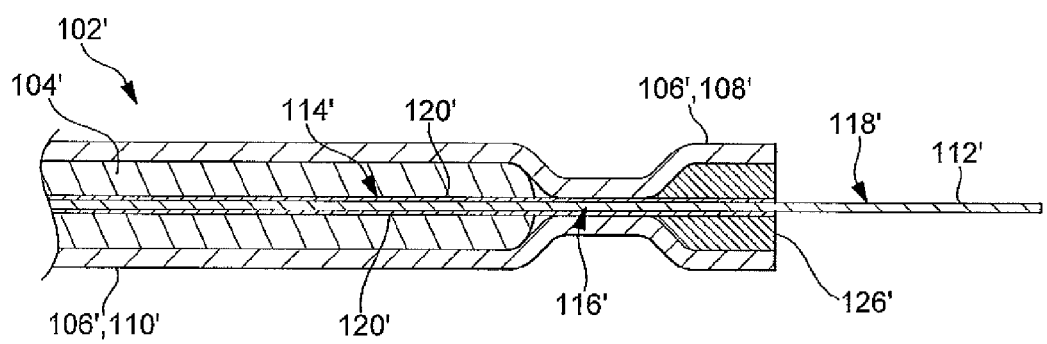
FIG. 4 is a fragmentary side cross sectional view of the battery cell assembly according to another embodiment of the present disclosure.

With reference to FIG. 4, the battery cell assembly 102' according to another embodiment of the disclosure is shown. Like or related structure from FIGS. 1-3 is shown in FIG. 4 with the same reference numeral and a prime (') symbol for the purpose of clarity. As shown in FIG. 4, the internal portion 114' of the cooling element 112' may be disposed inside at least a portion of the battery cell 104' of the battery cell assembly 102'. The removal of heat from the battery cell 104' in operation is thereby facilitated.

Advantageously, the battery cell assembly 102, 102' of the present disclosure has a simplified design and a reduced number of parts relative to known battery cell assemblies. Part handling during manufacturing of the battery cell assembly 102, 102' is likewise minimized. As established hereinabove, the electrical and thermal aspects of the present battery cell assembly 102, 102' are decoupled. It should also be appreciated that the outwardly extending external portion 118, 118' of the cooling element 112, 112' enables air cooling of the battery cell assembly 102, 102' in operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery cell assembly, comprising:
    a battery cell including active material configured to generate power from an electrochemical reaction;
    a pouch formed from an insulating material, the pouch enveloping the battery cell; and
    a cooling element having an internal portion and an external portion, the internal portion disposed within the pouch and thereby also enveloped by the pouch;
    an electrical insulating coating surrounding the internal portion in direct thermal communication with the active material of the battery cell, with the external portion disposed outside of the pouch, the cooling element configured to transfer heat generated during the electrochemical reaction away from the battery cell.

2. The battery cell assembly of claim 1, wherein the external portion is free of the insulating coating.

3. The battery cell assembly of claim 1, wherein the cooling element is a metal plate.

4. The battery cell assembly of claim 3, wherein the cooling element is formed from one of copper and aluminum.

5. The battery cell assembly of claim 1, wherein the cooling element is a graphite foil impregnated with an electrically nonconductive polymer.

6. The battery cell assembly of claim 1, wherein the cooling element has a surface area greater than a surface area of a major surface of the battery cell.

7. The battery cell assembly of claim 1, wherein the battery cell has a first major surface and a second major surface, the internal portion of the cooling element disposed adjacent one of the first major surface and the second major surface.

8. The battery cell assembly of claim 1, wherein the internal portion of the cooling element is disposed entirely inside of the active material of the battery cell.

9. The battery cell assembly of claim 1, wherein the pouch includes a first pouch layer and a second pouch layer, and wherein the cooling element includes a sealing portion disposed between the internal portion and the external portion, the sealing portion positioned between the first pouch layer and the second pouch layer.

10. The battery cell assembly of claim 9, wherein the sealing portion is also surrounded by the insulating coating, the insulating coating positioned in direct contact with both the first pouch layer and the second pouch layer.

11. The battery cell assembly of claim 10, wherein the battery cell is also disposed between the first pouch layer and the second pouch layer.

12. The battery cell assembly of claim 11, wherein the sealing portion of the cooling element abuts each of the first pouch layer and the second pouch layer to seal the battery cell within the pouch.

13. The battery cell assembly of claim 11, further comprising a rigid frame disposed between the first pouch layer and the second pouch layer.

14. The battery cell assembly of claim 13, wherein the cooling element is disposed through the rigid frame.

15. The battery cell assembly of claim 14, wherein the rigid frame is disposed adjacent the sealing portion of the cooling element, the external portion disposed through the rigid frame.

16. The battery cell assembly of claim 1, further comprising a pair of electrical tabs in communication with the battery cell and extending outwardly from the pouch.

17. The battery cell assembly of claim 16, wherein the pouch has a first end and a second end and a first side and a second side, the pair of electrical tabs extending outwardly from at least one of the first end and the second end, and the external portion the cooling element extending outwardly from at least one of the first side and the second side of the pouch.

18. A battery cell assembly, comprising:
    a battery cell including active material configured to generate power from an electrochemical reaction;
    a pouch formed from an insulating material, the pouch enveloping the battery cell, the pouch including a first pouch layer and a second pouch layer; and
    a cooling element having an internal portion, a sealing portion, and an external portion, the internal portion disposed within the pouch in thermal communication with the battery cell and thereby also enveloped by the pouch;
    an electrical insulating coating surrounding the internal portion in direct thermal communication with the active material of the battery cell, the sealing portion abutting each of the first pouch layer and the second pouch layer to seal the battery cell within the pouch, the external portion disposed outside of the pouch, the cooling element configured to transfer heat generated during the electrochemical reaction away from the battery cell.

19. A battery cell assembly, comprising:
    a battery cell including active material configured to generate power from an electrochemical reaction;
    a pouch formed from an insulating material, the pouch enveloping the battery cell, the pouch including a first pouch layer and a second pouch layer, the pouch having a first end and a second end and a first side and a second side;
    a pair of electrical tabs in communication with the battery cell and extending outwardly from at least one of the first end and the second end of the pouch, and the external portion of the cooling element extending outwardly from at least one of the first side and the second side of the pouch;

a rigid frame disposed between the first pouch layer and the second pouch layer; and a cooling element having an internal portion, a sealing portion, and an external portion, the internal portion disposed within and thereby enveloped by the pouch and in thermal communication with the battery cell;

an electrical insulating coating surrounding the internal portion and in direct thermal communication with the active material of the battery cell, wherein the sealing portion abuts each of the first pouch layer and the second pouch layer to seal the battery cell within the pouch, and the external portion is disposed through the rigid frame and outside of the pouch, the cooling element configured to transfer heat generated during the electrochemical reaction away from the battery cell.

20. The battery cell assembly of claim 16, wherein the external portion of the cooling element extends outwardly from the pouch in a first direction, at least one of the electrical tabs extends outwardly from the pouch in a second direction, and the first direction is orthogonal to the second direction.

* * * * *